United States Patent
Kurz

[19]

[11] Patent Number: 5,938,946
[45] Date of Patent: Aug. 17, 1999

[54] ELECTRIC WELDING DEVICE AND METHOD OF WELDING A FASTENING ELEMENT

[75] Inventor: Roland Kurz, Linden-Leihgestern, Germany

[73] Assignee: Emhart Inc., Newark, Del.

[21] Appl. No.: 08/881,315

[22] Filed: Jun. 25, 1997

[30] Foreign Application Priority Data

Jun. 27, 1996 [DE] Germany .......................... 196 25 886

[51] Int. Cl.⁶ .................................................. B23K 9/20
[52] U.S. Cl. ................................. 219/99; 219/74; 219/98
[58] Field of Search .................................. 219/98, 99, 74

[56] References Cited

U.S. PATENT DOCUMENTS

| | | | |
|---|---|---|---|
| 2,727,123 | 12/1955 | Gregory, Jr. | 219/98 |
| 2,790,066 | 4/1957 | Haynes et al. | 219/98 |
| 4,201,904 | 5/1980 | Weidman | 219/98 |
| 4,969,582 | 11/1990 | Gauger | |
| 5,349,152 | 9/1994 | Renner | |

*Primary Examiner*—Clifford C. Shaw
*Attorney, Agent, or Firm*—Edward D. Murphy

[57] ABSTRACT

An electric welding device for welding a fastening element (4) having a through-duct (17) on a workpiece is proposed. The welding device comprises a conveying and holding system (1) having a guide member (2) with a guide duct (3). The fastening element (4) is supplied to the guide duct and is held in one of its ends during the welding process. Within the guide duct there is arranged a loading member (6) which is capable of moving to and fro in the longitudinal direction thereof and has a head (7) which can be brought to rest on the fastening element (4). The loading member has a duct (9) with an inlet (10) and an outlet (11) formed on the head (7). A gas supply duct (12) opens into the guide duct (3). The loading member (6) closes the gas supply duct (12) in a first position. In a second position, the loading member (6) connects the inlet (11) to the gas supply duct (12) so a gas flows to the welding position during the welding process.

25 Claims, 1 Drawing Sheet

ELECTRIC WELDING DEVICE AND METHOD OF WELDING A FASTENING ELEMENT

BACKGROUND OF THE INVENTION

The invention relates to an electric welding device and to a method of welding a fastening element, in particular a weld stud, on a workpiece.

Electrically operated welding devices are known which operate by the lift-and-strike method. The lift-and-strike method is a particular type of arc stud welding method in which the stud is applied to the workpiece and is removed from it to form an arc between the stud and the workpiece. After a molten pool has been formed on the stud and on the workpiece, the stud is re-applied to the workpiece while extinguishing the arc and is held in its position until the molten material solidifies. A device which operates by the lift-and-strike method is known, for example, from German Patent No. 32 01 979.

The supply of fastening elements to the welding device is substantially automated. The fastening elements are conveyed pneumatically from a store via a supply line to the welding device. The device has a guide member with a guide duct to which a fastening element is supplied. In the known devices, the conveying and holding system has, at its free end, several flexible holding tongues for grasping and holding a fastening element. A loading member capable of moving to and fro in the longitudinal direction of the guide duct is provided for positioning a fastening element in the conveying and holding system. It has a head which can be brought to rest on the fastening element. An electric welding device of this type is known from German Utility Model No. G 295 13 158.6.

Fastening elements are welded to a workpiece using the electrically operated welding device. The fastening elements are preferably substantially tubular in design. During the welding process there is a risk with tubular fastening elements that the molten material produced will be drawn radially inwardly owing to the magnetic field and constriction of the arc. Owing to this effect, there is a risk that the welded joint between the fastening element and the workpiece will be unsatisfactory.

A welding device is known from German Patent No. 42 00 199, in which a gas is supplied to the welding position. For this purpose, the device has a gas duct which is formed in a stud holding device. The stud has a through-bore which is formed substantially in the longitudinal direction of the duct and through which the gas passes to the welding position.

On the basis of the foregoing, the object of the present invention is to provide an electric welding device and a method of welding a fastening element, in particular a weld stud, by means of which the penetration of molten material formed during the welding process into the substantially tubular fastening element is avoided.

According to the invention, an electric welding device for welding a tubular fastening element, in particular a weld stud, on a workpiece with a conveying and holding system comprises a guide member with a guide duct to which a fastening element is supplied and at one of whose ends the fastening element is held during the welding process, and with a loading member which is capable of moving to and fro in the longitudinal direction of the guide duct and has a head which can be brought to rest on the fastening element is characterized in that the loading member has a duct with an inlet and an outlet, the outlet being formed at the head. In the guide duct there opens a gas supply duct which is closed by the loading member in a first position of the loading member and can be connected to the inlet in a second position of the loading member. The loading member adopts the second position during the welding process, so a gas can pass via the gas supply duct and through the loading member to the weld stud which has a through-duct. Admission of the melt during the welding process into the fastening element designed substantially as a hollow body is prevented by the supply of a gas to the welding position. With respect to the gas supply duct formed in the guide duct, the loading member acts as a valve which only clears the gas supply duct when the welding process is carried out.

A design of a welding device in which the guide duct and the loading member have a substantially circular cross section is preferred. The loading member can be a tubular component of which the end opposite the head is hermetically sealed.

According to a further advantageous embodiment of the welding device, it is proposed that the loading member be guided in a substantially gas-tight manner in the guide duct. This embodiment of the welding device is advantageous if the gas is an inert gas, in particular an argon-containing inert gas. The consumption of the gas is reduced by the gas-tight design so the economic viability of the welding device is further improved.

According to a further advantageous embodiment of the welding device, it is proposed that the inlet into the duct of the loading member be designed in the form of an elongated recess which extends in the longitudinal direction of the loading member. The length of the recess or of the inlet is calculated such that it corresponds at least to a displacement path of the loading member during the welding process. This ensures that the supply of gas is not interrupted during the advance of the loading member.

According to a further advantageous embodiment of the welding device, it is proposed that the loading member have a nozzle with the inlet, the nozzle penetrating at least partially into a socket formed on the guide member. The nozzle is preferably guided in a substantially gas-tight manner in the socket. With this embodiment, a reliable and gas-tight supply of a gas into the loading member is ensured using simple means.

The gas which is supplied in the device can be supplied from a gas source, for example gas bottles, via a feed line connected to the gas supply duct. The gas is preferably air. To avoid oxidation in the welding position, as described in German Patent No. 42 00 199, it is proposed that the gas be an inert gas.

With the method according to the invention for welding a fastening element, in particular a weld stud, on a workpiece, it is proposed that a fastening element comprising a through-duct be supplied to a conveying and holding system comprising a guide member with a guide duct and be conveyed by a loading member capable of moving to and fro in the longitudinal direction of the guide duct to one end of the guide duct and be held therein during the welding process, the loading member closing, in a first position, a gas supply duct which opens into the guide duct and clearing it in a second position so a gas flows through a duct formed in the loading member and the through-duct in the fastening element to the welding position.

BRIEF DESCRIPTION OF THE DRAWINGS

Further advantages and features of the welding device according to the invention and of the method will be described with reference to the embodiments illustrated in the drawings.

DESCRIPTION OF THE PREFERRED EMBODIMENT

Figure 1:
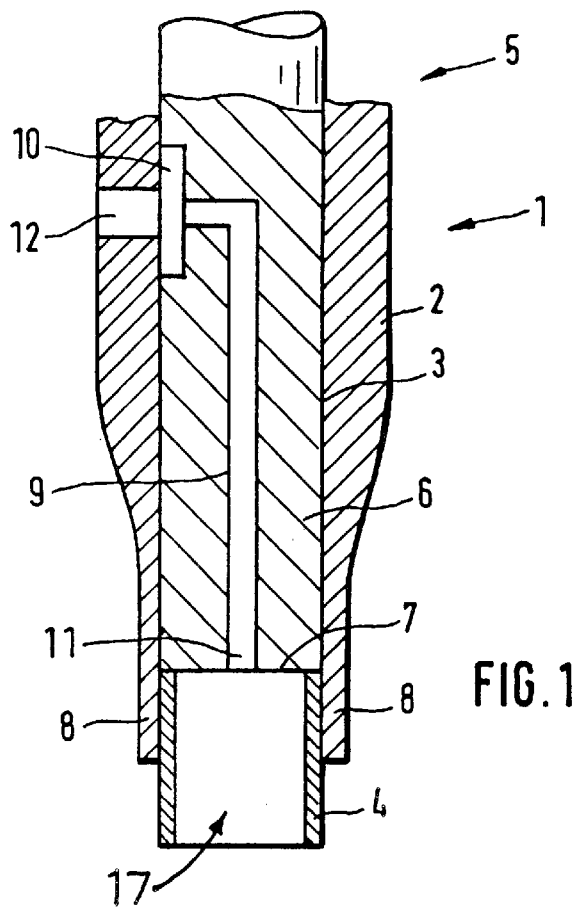
FIG. 1 shows a first embodiment of a welding device in section.

The basic construction of a welding device is described, for example, in German Utility Model No. G 295 13 158.6. The welding device for welding a fastening element 4 has a conveying and holding system 1. The conveying and holding system 1 has a guide member 2 with a guide duct 3. A fastening element 4 is supplied in the guide member 2 and the fastening element is held in one of its ends during the welding process. For this purpose, the guide member 2 has elastic tongues 8 at its front end. A loading member 6 capable of moving to and fro in the longitudinal direction of the guide duct 3 is arranged within the guide duct 3. The loading member 6 has a head 7 which can be brought onto the fastening element 5. The loading member 6 has a duct 9 extending in the longitudinal direction of the loading member 6. The duct 9 has an inlet 10 and an outlet 11. The outlet 11 is formed on the head 7. A gas supply duct 12 opens into the guide duct 3. The gas supply duct 12 can be connected to the gas source via a conduit, not shown. The inlet 10 and the gas supply duct 12 are formed relative to one another in such a way that the gas supply duct 12 is closed in a first position of the loading member 6. The gas supply duct 12 can be connected to inlet 10 in a second position of the loading member 6. The loading member 6 adopts its second position during the welding process.

During the welding process, a gas flows via the gas supply duct 12 into the inlet 10 and from there via the duct 9 and the outlet 11 into the hollow fastening element 5. The gas which is introduced into the fastening element 4 at a higher pressure than the ambient atmosphere presses molten material formed at the welding position outwardly, preventing the magnetic field of the arc from introducing the molten material into the fastening element 4 designed as a hollow body. As shown in FIG. 1, the inlet 10 is designed in the form of an elongated recess. This ensures that the gas supply is not interrupted during the advance of the loading member 6 for immersion of the fastening element 4 into molten material.

Figure 2:
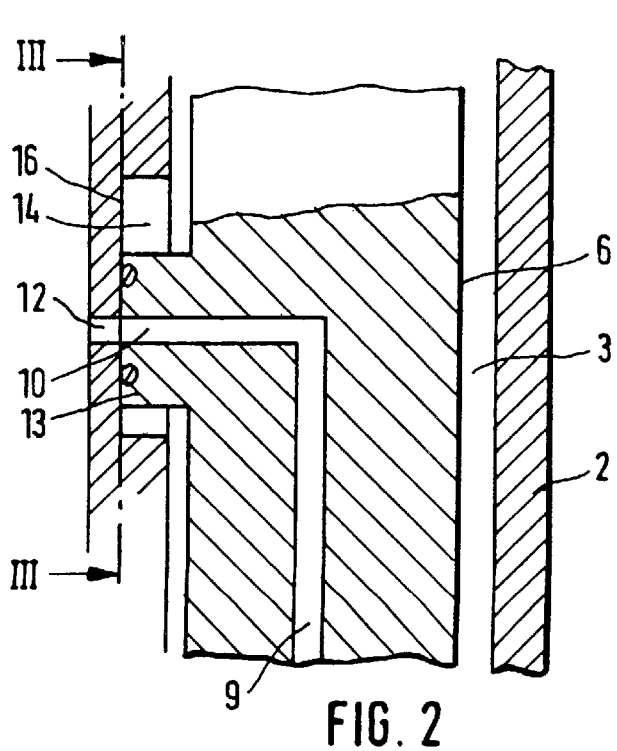
FIG. 2 shows a second embodiment of a welding device in section.
Figure 3:
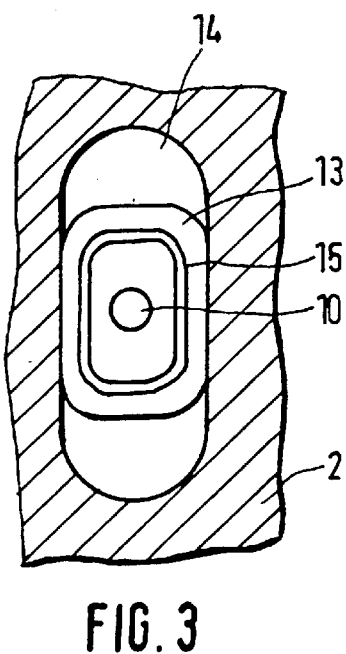
FIG. 3 is a view along section line III—III according to FIG. 2.

FIG. 2 shows a second embodiment of an electric welding device. The welding device has a guide member 2 with a guide duct 3. A loading member 6 capable of moving to and fro is arranged in the guide duct 3. The loading member 6 has a duct 9 with an inlet 10. The inlet 10 can be connected to a gas supply duct 12 formed in the guide member 2. In the illustration according to FIG. 2, the inlet 10 of the duct 9 is connected in terms of fluid mechanics to the gas supply duct 12. The loading member 6 has a nozzle 13 in which the inlet 10 is formed. The nozzle 13 partially penetrates a socket 14 formed on the guide member 2. The socket 14 extends in the displacement direction of the loading member 6. The length of the socket 14 is greater than the length of the nozzle 13. A seal 15 which rests on the wall 16 of the socket 14 is arranged in the end face of the nozzle 13. The distance between the seal 15 and the inlet 10 in the displacement direction of the loading member 6 is calculated such that this distance corresponds at least to the displacement path of the loading member during the welding process.

What is claimed is:

1. An electric welding device for welding a fastening element on a workpiece, said welding device comprising:

a guide member including a longitudinally elongated guide duct operable to receive the fastening element;

a loading member movable in the longitudinal direction of said guide duct, said loading member having a head operably abutting an end of the fastening element;

a loading duct located inside of said loading member, said loading duct having an outlet formed in the head and a transversely oriented inlet, said loading duct extending in the substantially longitudinal direction from said head to an intermediate internal portion of said loading member, said loading duct extending in a substantially transverse direction from said inlet to said intermediate internal portion; and a gas supply duct opening into said guide duct, said supply duct being sealed by an external surface of said loading member in a first position, said supply duct being connected to said inlet when said loading member is in a second position during the welding process.

2. The welding device according to claim 1, where in said guide duct and said loading member each have a substantially circular cross section.

3. The welding device according to claim 1, wherein said loading member is guided in a substantially gas-tight manner in said guide duct.

4. The welding device according to claim 1, wherein said inlet includes an elongated recess which extends in the longitudinal direction, the length of said recess corresponding at least to a displacement path of said loading member during the welding process.

5. The welding device according to claim 1, further comprising an apertured socket located through a side wall of said guide duct, said loading member having a transversely extending nozzle with said inlet, said nozzle transversely penetrating at least partially into said socket.

6. The welding device according to claim 5, further comprising a seal having a substantially circular cross section, said nozzle being movable inside said socket and being sealed in a substantially gas-tight manner in said socket by said seal.

7. The welding device according to claim 1, further comprising a feedline, said gas supply duct being connected to a gas source via said feedline.

8. The welding device according to claim 1, wherein the gas is air.

9. The welding device according to claim 1, wherein the gas is an inert gas.

10. A method of welding a centrally hollow tubular fastening element on a workpiece using a device having a guide member with a guide duct, the device also having a movable loading member, the method comprising operably moving the fastening element in a longitudinally elongated direction of the guide duct during the welding process, a surface of the loading member closing a gas supply duct which opens into the guide duct when the loading member moves to a first position, and the loading member opening the gas supply duct when the loading member is moved to a second position, a gas flowing through a duct in the loading member and internally through the hollow center of the fastening element in the welding position.

11. The method according to claim 10, further comprising flowing air through the duct in the loading member and the hollow center of the fastening element.

12. The method according to claim 10, further comprising flowing an inert gas through the duct in the loading member and the hollow center of the fastening element.

13. An electric welding apparatus comprising:

a tubular workpiece element having a substantially hollow center;

a longitudinally elongated guide member having an internal guide duct, said element being operably received within an end of the guide duct; and a member operably advancing and retracting within said guide duct, said member operably moving said element relative to said guide member, a movable duct movable in concert with said member, an outlet of said movable duct being open to said center of said element when said element is located in said guide duct;

said member being operable to allow a fluid to flow through said movable duct and through said center of said element during a welding process.

14. The apparatus of claim 13 further comprising a gas supply duct located in said guide member, an inlet of said movable duct aligning with said gas supply duct when said member is in a first position but not when said member is in a second position, gas flowing through said center of said element when said member is in said first position but not when said member is in said second position.

15. The apparatus of claim 14 wherein said member has a substantially circular-cylindrical external surface and said guide duct is defined by a substantially circular-cylindrical internal surface.

16. The apparatus of claim 15 wherein at least a portion of said external surface of said member contacts against at least a portion of said internal surface of said guide duct in a substantially air-tight manner.

17. The apparatus of claim 14 wherein said gas supply duct extends in a substantially transverse manner through said guide member.

18. The apparatus of claim 13 wherein said member has an external surface inwardly spaced from said guide duct.

19. The apparatus of claim 13 wherein said movable duct is located internal to said member.

20. The apparatus of claim 13 wherein a gas is transmitted through said movable duct and through said center of said element at a pressure greater than an ambient atmospheric pressure to deter flowing of molten weld material into said center of said element.

21. A method of welding an element to a workpiece by using a device having a guide duct, a movable member and a gas supply, the method comprising:

(a) longitudinally moving the element within the guide duct relative to the workpiece;

(b) longitudinally moving the member within the guide duct;

(c) flowing gas through a passageway in the movable member;

(d) flowing the gas from the passageway of the movable member into a hollow section of the element; and (e) substantially deterring molten weld material from flowing into the hollow section of the element during welding.

22. The method of claim 21 further comprising:

(a) introducing the gas from the gas supply to the passageway of the movable member in a substantially transverse direction; and (b) flowing the gas from the passageway of the movable member to the hollow section of the element in a substantially longitudinal direction.

23. The method of claim 21 further comprising movement of the movable member relative to the gas supply acting as a valve to selectively open and close gas flow to the passageway of the movable member.

24. The method of claim 21 further comprising moving an external surface of the element directly against an internal surface defining the guide duct.

25. The method of claim 21 further comprising abutting a substantially flat end of the movable member against an end of the element and positioning an outlet of the passageway centrally to the hollow section of the element.

* * * * *